(12) United States Patent
Lu et al.

(10) Patent No.: US 9,613,311 B2
(45) Date of Patent: Apr. 4, 2017

(54) RECEIVING VOICE/SPEECH, REPLACING ELEMENTS INCLUDING CHARACTERS, AND DETERMINING ADDITIONAL ELEMENTS BY PRONOUNCING A FIRST ELEMENT

(71) Applicants: Beijing Lenovo Software Ltd., Beijing (CN); Lenovo (Beijing) Limited, Beijing (CN)

(72) Inventors: Youlong Lu, Beijing (CN); Rong Yang, Beijing (CN); Zhen Jiao, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 449 days.

(21) Appl. No.: 13/835,007

(22) Filed: Mar. 15, 2013

(65) Prior Publication Data

US 2013/0262346 A1 Oct. 3, 2013

(30) Foreign Application Priority Data

Mar. 31, 2012 (CN) .......................... 2012 1 0093701

(51) Int. Cl.
*G06F 15/18* (2006.01)
*G06N 5/02* (2006.01)
(Continued)

(52) U.S. Cl.
CPC ............. *G06N 5/02* (2013.01); *G06F 3/0236* (2013.01); *G06F 3/04883* (2013.01); *G10L 13/033* (2013.01)

(58) Field of Classification Search
CPC .............................. G10L 13/033; G10L 15/00
(Continued)

(56) References Cited

U.S. PATENT DOCUMENTS 4,777,600 A  10/1988  Saito et al.
7,143,350 B2 * 11/2006  Jurion ................. G06F 17/2223
                                                              704/8
8,726,148 B1 *  5/2014  Battilana ....................... 715/234

FOREIGN PATENT DOCUMENTS

CN         1073290 A    6/1993
CN       101957812 A    1/2011
(Continued)

OTHER PUBLICATIONS

First Office Action, including Search Report, for Chinese Patent Application No. 201210093701.5, dated Sep. 30, 2016, 18 pages.

*Primary Examiner* — David Vincent
(74) *Attorney, Agent, or Firm* — Westman, Champlin & Koehler, P.A.

(57) ABSTRACT

Electronic devices and methods for processing an input content are disclosed. The method includes: obtaining a first input content through a first operation; displaying the first input content on the display unit, the first input content comprising at least two elements; determining a first element from the at least two elements in accordance with a predetermined rule; obtaining a second element through a second operation, the second element not belonging to the at least two elements; updating the first element with the second element at the position where the first element has been displayed on the display unit; and displaying the second element on the display unit.

20 Claims, 3 Drawing Sheets

(51) Int. Cl.
  *G10L 13/033*  (2013.01)
  *G06F 3/023*  (2006.01)
  *G06F 3/0488*  (2013.01)
(58) Field of Classification Search
  USPC .................................................. 706/12, 45
  See application file for complete search history.

(56) References Cited

FOREIGN PATENT DOCUMENTS

| | | |
|---|---|---|
| CN | 102023782 A | 4/2011 |
| CN | 102270048 A | 12/2011 |
| JP | S62-31467 A | 2/1987 |

\* cited by examiner

RECEIVING VOICE/SPEECH, REPLACING ELEMENTS INCLUDING CHARACTERS, AND DETERMINING ADDITIONAL ELEMENTS BY PRONOUNCING A FIRST ELEMENT

CROSS-REFERENCE TO RELATED APPLICATION

This Application claims priority to Chinese Application No. 201210093701.5, filed on Mar. 31, 2012, in Chinese, the contents of which are hereby incorporated by reference in their entirety.

TECHNICAL FIELD

The present application relates to data processing technologies, and more particularly, to electronic devices and methods for processing input contents.

BACKGROUND

As electronic devices become increasingly powerful, users may use the electronic devices for more applications. For example, a user may use a smart phone or a communication-capable tablet computer for communications, transmitting Short Message Service (SMS) messages, sharing a pictures or videos, listening to music, watching TV programs or movies, and so on.

The user needs to interact with the electronic device. During such interaction, the user may be required to input contents to the electronic device in various input manners. For example, the user may input Chinese characters, English letters or symbols using a keyboard input method, or input texts or graphics using a handwriting input method, or input voices using a voice input method.

The inventors have found that there are problems with conventional method for processing input contents.

The keyboard input method requires the user to operate keys on a physical or virtual keyboard with his or her hand or some tool (such as a stylus). If the user is standing in a running bus and thus needs to hold a handrail with one hand, it is inconvenient for him or her to input via a keyboard. In particular, if the user wants to modify or adjust the input content, he or she needs to locate where to be modified and then modify it with his or her hand or tool. In this case, it is inconvenient and unintelligent to make modification.

Compared with the keyboard input method, the voice and handwriting input methods are more convenient. With the voice input method, the user can directly speak for input without use of hand or tool. However, recognition capability of existing voice or handwriting input methods are limited, and thus recognition errors occur frequently. For example, the user may say "王兰 (Wang Lan)," and it may be recognized as "王楠 (Wang Nan)." The user may write "党 (Dang)," and it may be recognized as "赏 (Shang)," In these cases, the recognition results need to be modified or corrected. However, the currently available modification methods are limited and inconvenient. For example, the user has to use the keyboard, input method to modify the voice recognized as "王兰", which is inconvenient and unintelligent.

In the conventional methods, Modifying or processing input contents is inconvenient and unintelligent to a user, which degrades user experience of using electronic devices.

SUMMARY

An object of the present invention is to provide electronic devices and methods for processing input contents.

According to an embodiment of the present application, a method for processing an input content in an electronic device including a display unit is provided. The method may include obtaining a first input content through a first operation, displaying the first input content on the display unit, the first input content including at least two elements, determining a first element from the at least two elements in accordance with a predetermined rule, obtaining a second element through a second operation, the second element not belonging to the at least two elements, updating the first element with the second element at a position where the first element has been displayed on the display unit, and displaying the second element on the display unit.

In an embodiment, obtaining a first input content through a first operation may include obtaining the first input content in response to the first operation on an application executed in the electronic device.

In an embodiment, obtaining the first input content in response to the first operation on an application executed in the electronic device may include activating the application, detecting whether the first operation is performed on the application, generating a first operation instruction in response to the first operation when it is detected that the first operation is performed on the application, and executing the first operation instruction to obtain the first input content through the application.

In an embodiment, the application is a content conversion application or an input application. When the application is the content conversion application, the first operation instruction is a conversion instruction for converting a content into the first input content. When the application is the input application, the first operation instruction is an input instruction for inputting the first input content.

In an embodiment, executing the first operation instruction to obtain the first input content through the application may include executing the conversion instruction to convert a sound or text content into the first input content using the content conversion application, or executing the input instruction to input the first input content using the input application.

In an embodiment, determining a first element from the at least two elements in accordance with a predetermined rule may include determining at least two candidate elements included in the first input content according to the predetermined rule, the at least two candidate elements including at least a command type element and a command object type element, obtaining a selection instruction in response to a selection by a user, and executing the selection instruction to determine the first element from the at least two elements.

In an embodiment, executing the selection instruction to determine the first element from the at least two elements may include executing the selection instruction to determine an editable candidate element from the at least two candidate elements, and determining, as the first element, an element of the editable candidate element which belongs to the at least two elements.

In an embodiment, the first element may be a replaceable element, and any of the at least two elements other than the first element may be an irreplaceable element.

In an embodiment, obtaining a second element through a second operation may include generating and displaying on the display unit at least one operation object for obtaining the second element in correspondence with the first element, generating an operation instruction based on a response to the second operation corresponding to the at least one operation object, and executing the operation instruction to obtain the second element.

In an embodiment, the method may further include, after determining the first element from the at least two elements in accordance with the predetermined rule, judging whether there is a second operation for obtaining the second element before a timing value of a timer in the electronic device reaches a predetermined value, and obtaining the second element through the second operation when there is a second operation for obtaining the second element.

According to another embodiment of the present application, an electronic device is provided. The electronic device may include a display unit, and a processor connected to the display unit. The processor may be configured to obtain a first input content through a first operation and transmit the first input content to the display unit to display the first input content on the display unit, the first input content including at least two elements. The processor may be further configured to determine a first element from the at least two elements in accordance with a predetermined rule, obtain a second element through a second operation and transmit the second element to the display unit, and update the first element with the second element at a position where the first element has been displayed on the display unit to display the second element on the display unit. The second element does not belong to the at least two elements.

One or more of embodiments of the present application have one or more advantages as follows.

First, according to the present application, when a user wants to modify an input content, the input content including a number of elements can be recognized to determine modifiable or replaceable elements, providing the user with more than one modification options. In this way, it is possible to solve the problems that the modification manner is limited, inconvenient and unintelligent, and to achieve a convenient, rapid and intelligent modification process.

Second, when the input content contains an instruction for instructing the electronic device to perform an operation, a timer may used. When the timing value of the timer does not reach a predetermined value, the instruction will not be executed. The user may modify or terminate the instruction. In this way, misoperations can be effectively avoided.

Third, the user may modify or terminate the instruction to avoid misoperations, and accuracy of instruction execution can be increased, thereby improving the user experience.

DETAILED DESCRIPTION OF THE EMBODIMENTS

In the following, the ideas and advantages of embodiments of the present application will be described with reference to the figures.

First Embodiment

In the first embodiment, an electronic device is provided. The electronic device may be a smart phone or any other electronic product such as a tablet computer.

Figure 2:
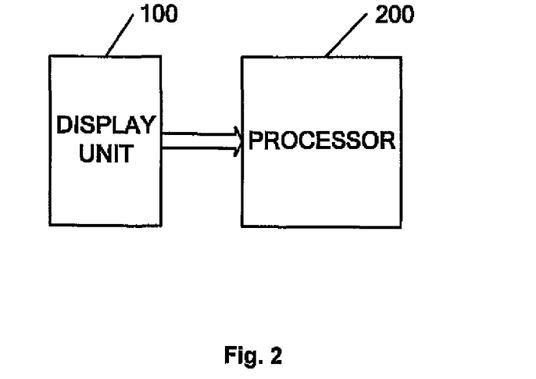
FIG. 2 is a block diagram of an electronic device according to a first embodiment of the present application.

Referring to FIG. 2 which is a block diagram of an electronic device according to the first embodiment, the electronic device includes a display unit 100, and a processor 200 connected to the display unit 100.

Figure 1:
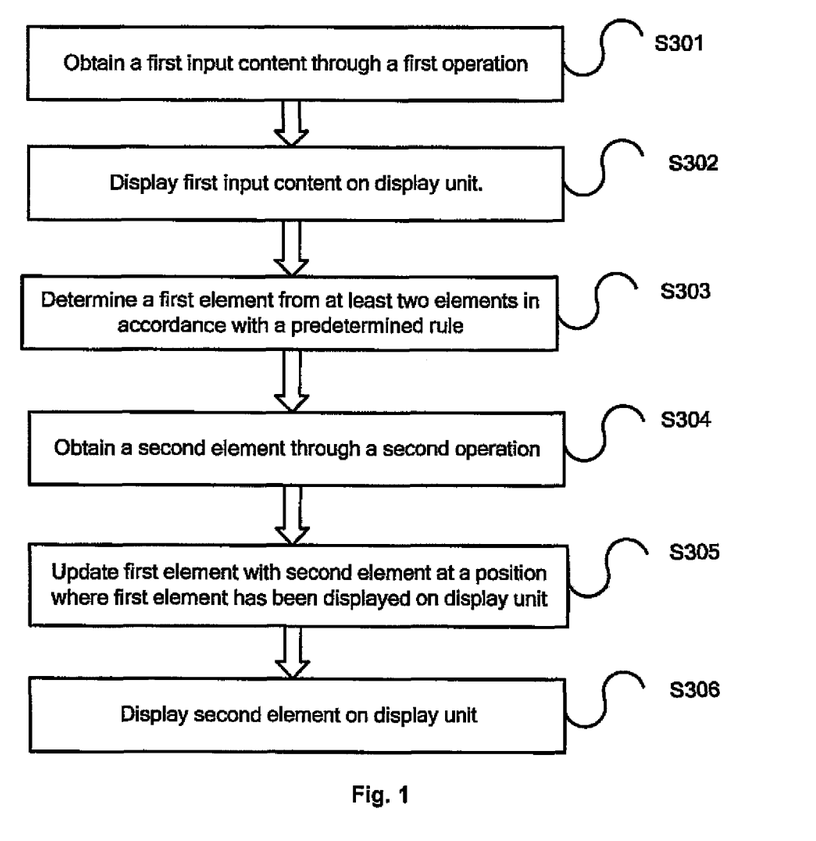
FIG. 1 is a flowchart illustrating a method for processing an input content according to a first embodiment of the present application.

Next, the process of a method for processing an input content and the operations of the electronic device according to the first embodiment will be described with reference to FIGS. 1 and 2.

The method for processing an input content according to the first embodiment may be applied in the above electronic device. In the following description, the electronic device is assumed to be a smart phone for example.

The method for processing an input content according to the first embodiment includes the following steps.

At step S301, a first input content is obtained through a first operation.

In this embodiment, the step S301 may particularly include obtaining a first input content in response to a first operation applied on an application executed in the electronic device. Herein, the terms "application" and "application program" are exchangeable.

The step of obtaining the first input content in response to the first operation may include activating the application in response to a trigger from a user or by a direct invocation of some function in the application, detecting whether the first operation is performed on the application, generating a first operation instruction in response to the first operation when it is detected that the first operation is performed on the application, and executing the first operation instruction to obtain the first input content through the application.

Here, the application can be a content conversion application, such as a voice recognition application, or an input application, such as a voice input application, a handwriting input application or a keyboard input application.

When the application is the content conversion application, the first operation instruction is a conversion instruction for converting a content into the first input content. In this case, the conversion instruction is executed to convert a sound or text content into the first input content using the content conversion application.

For example, the smart phone has a voice message mailbox containing a message from "王兰 (Wang Lan)": "Hi, I'm 王兰 (Wang Lan), please send a SMS message to me when you are back." In this case, a voice recognition application in the smart phone recognizes the message, and obtain an input content of "send a SMS message to 王兰 (Wang Lan)".

When the application is an input application, the first operation instruction is an input instruction for inputting the first input content. In this case, the input instruction is executed to input the first input content using the input application. For example, when a user A wants to input an content to the smart phone, he/she can activate a voice input application installed in the smart phone and speak to the smart phone: "send a SMS message to 王兰 (Wang Lan)". In this case, the smart phone can gather the voice, recognizes it using a voice recognition module in the smart phone and obtains a text of "send a SMS message to 王兰 (Wang Lan)".

After obtaining the first input content in the step S301, the method proceeds to step S302 in which the first input content is displayed on the display unit 100. Here, the first input content includes at least two elements. Each of the at least two elements may be a character, a word or a phrase. For example, the text "send a SMS message to 王兰(Wang Lan)" includes three elements including a third element of "send a SMS message", a second element of "to" and a first element of "王兰(Wang Lan)".

In the example where the first input content is "send a SMS message to 王兰(Wang Lan)", at step S302, the text "send a SMS message to 王兰(Wang Lan)" is displayed on the display unit of the smart phone.

After displaying the first input content on the display unit 100 of the electronic device at the step S302, the method of this embodiment proceeds to step S303 in which a first element is determined from the at least two elements in accordance with a predetermined rule.

In this embodiment, the step of determining a first element from the at least two elements in accordance with a predetermined rule may include determining at least two candidate elements included in the first input content according to the predetermined rule, the at least two candidate elements including at least a command type element and a command object type element, obtaining a selection instruction in response to a selection by a user, and executing the selection instruction to determine the first element from the at least two elements.

In this embodiment, the step of executing the selection instruction to determine the first element from the at least two elements may include executing the selection instruction to determine an editable candidate element from the at least two candidate elements, and determining, as the first element, an element of the editable candidate element which belongs to the at least two elements.

In this embodiment, when the first element is a replaceable element, any of the at least two elements other than the first element is an irreplaceable element.

Next, the process of the step S303 in this embodiment will be explained in the example where the first input content is "send a SMS message to 王兰(Wang Lan)", such that it can be more apparent to those skilled in the art.

The content "send a SMS message to 王兰(Wang Lan)" may be divided into three elements as above, including a third element of "send a SMS message", a second element of "to" and a first element of "王兰(Wang Lan)". Then, each element is compared with a corresponding database.

In particular, the element of "send a SMS message" is compared with a command database. When the element of "send a SMS message" is included in the command database, it is determined to be a command type element. In this embodiment, a command type element corresponds to a third candidate element, which is also known as a grammar slot.

The element of "to" is compared with a generic language database. When the element of "to" is included in the generic language database, it is determined as a generic language type element. In this embodiment, a generic language type element corresponds to a second candidate element, which is also known as a grammar slot.

The element of "王兰(Wang Lan)" is compared with a command object database. When the element of "王兰(Wang Lan)" is included in the command object database, it is determined as a command object type element. In this embodiment, a command object type element corresponds to a first candidate element, which is also known as a grammar slot.

It is determined that the content "send a SMS message to 王兰(Wang Lan)" contains three candidate elements or grammar slots, of which the third candidate element is a command type element, the second candidate element is a generic language type element and the first candidate element is a command object type element.

When the content is displayed on the display unit 100 of the electronic device, one candidate element, or grammar slot, can be displayed in one framed area. For example, when the first input content is "send a SMS message to 王兰(Wang Lan)", the first element "王兰(Wang Lan)" is displayed in a first framed display area, the second element "to" is displayed in a second framed display area, and the third element "send a SMS message" is displayed in a third framed display area. The grammar slots may not be displayed in framed areas. Other display schemes can also be used.

After determining that the content "send a SMS message to 王兰(Wang Lan)" contains three candidate elements, the first candidate element will be determined as an editable candidate element in any of the following two methods.

In the first method, the user may perform a selection by pressing a key in a physical keyboard or touching the display unit 100. For example, when the display unit 100 is a touch screen, the user may click on a first framed display area corresponding to the first candidate element. Upon detection of the click action, the electronic device generates a selection instruction in response to the click action, and then executes the selection instruction to determine the first candidate element as an editable candidate element. In this way, the user may edit the first element in the first candidate element, i.e., "王兰(Wang Lan)". When the first candidate element is editable, the second and third candidate elements are not editable. Alternatively, the user may perform a selection to determine the third candidate element as an editable candidate element.

In the second method, a command object type element may be preset as an editable element in the electronic device. In this case, since the command object type element is the first candidate element in this embodiment, the first candidate element is an editable candidate element. As such, the first element in the first candidate element, i.e., "王兰(Wang Lan)", is editable. Alternatively a command type element may o be preset as an editable candidate element. In the second method, the user does not need to perform any selection. Once a command object type element is recognized from the first input content, it may be set as the editable candidate element.

After determining the first element in the step S303, the method of this embodiment proceeds with step S304 where a second element is obtained through a second operation. The second element does not belong to the at least two elements.

In particular, the step of obtaining a second element through a second operation may include generating and displaying on the display unit at least one operation object for obtaining the second element in correspondence with the first element, generating an operation instruction based on a response to the second operation corresponding to the at least one operation object, and executing the operation instruction to obtain the second element.

In this embodiment, the method further includes, after determining the first element from the at least two elements in accordance with the predetermined rule, judging whether there is a second operation for obtaining the second element before a timing value of a timer in the electronic device reaches a predetermined value, and obtaining the second element through the second operation when there is a second operation for obtaining the second element.

Next, the process of step S304 in this embodiment will be explained with the example where the first input content is "send a SMS message to 王兰 (Wang Lan)", such that it can be more apparent to those skilled in the art.

When the first input content is "send a SMS message to 王兰 (Wang Lan)", in the step S303 the first element is determined as "王兰 (Wang Lan)". In this case, if the user wants to send a SMS message to "王楠 (Wang Nan)" instead of "王兰 (Wang Lan)", he or she needs to modify "王兰 (Wang Lan)" into "王楠 (Wang Nan)". As an alternative, the user may want to terminate the operation of sending a SMS message to 王兰 (Wang Lan). In order to deal with the above two scenarios, in the method of this embodiment, a time value may be preset as, for example, 30 s, and a timing value may be obtained from a timer in the electronic device.

If the electronic device does not detect that the user modifies "王兰 (Wang Lan)" or terminates the operation of sending a SMS message to 王兰 (Wang Lan) until the timing value reaches 30 s, the electronic device may invoke an SMS application to send a SMS message to 王兰 (Wang Lan).

The content of the SMS message may be pre-configured, such as "Hi, 王兰 (Wang Lan), please attend a meeting in Meeting Room 301 at 5:00 pm today."

Alternatively, the content of the SMS message may be input by the user to the SMS application using an input application. Here, the input application may be a keyboard input application, a handwriting input application or a voice input application. For, example, the user may input the content of the SMS message "Hi, 王兰 (Wang Lan), please attend a meeting in Meeting Room 301 at 5:00 pm today." using a handwriting input application.

As another example, the content of the SMS message may obtained by recognizing the voice spoken to the electronic device in the step S301 using a voice recognition module in the electronic device. For example, when the user to speaks "Hi, I'm 王兰 (Wang Lan), please send a SMS message to me when you are back to confirm whether you will attend the meeting in Meeting Room 301 at 5:00 pm today. Thanks!", the voice recognition module in the electronic device recognizes that the content of the SMS message to be sent to 王兰 (Wang Lan) is "Hi, 王兰 (Wang Lan), please attend a meeting in Meeting Room 301 at 5:00 pm today."

If the electronic device detects a modification operation by the user to modify "王兰 (Wang Lan)" before the timing value reaches 30 s, it generates and displays on the display unit 100 at least one operation object for obtaining the second element.

In a first example, the at least one operation object may be an element having pronunciation or meaning identical or similar to that of "王兰 (Wang Lan)", including "王楠 (Wang Nan)", "王蓝 (Wang Lan)", "王男 (Wang Nan)" and "汪兰 (Wang Lan)". These elements may be displayed in an area on the display unit 100 in a list form. Further, on the display unit 100, the grammar slot may be displayed in a framed area, an interface presenting these identical or similar elements may be displayed next to the first element within the grammar slot, that is, in an area adjacent to the framed area.

In a second example, the at least one operation object may be a link to an input application or an interface of an input application. For example, the interface may be an interface of a voice input application, including a microphone icon, a mute icon and a stop icon thereon. In this case, the user may directly modify "王兰 (Wang Lan)" into the user-desired "王楠 (Wang Nan)" by means of voice input, using the voice input application. As another example, the interface may be an interface of a keyboard input application, such as a virtual keyboard corresponding to Baidu input method or Sogou input method. On the interface of the keyboard input application, the user may directly modify "王兰 (Wang Lan)" into the user-desired "王 楠 (Wang Nan)" by means of keyboard input using the virtual keyboard of the keyboard input application. Further, the at least one operation object may be a link to a keyboard input application, such as an icon of Baidu Pinyin input method.

In a third example, the at least one operation object may be an icon of a link to a database including "王楠 (Wang Nan)". For example, it may be an icon of a contact database in the electronic device, or an icon of call record database in the electronic device. For example, it may be an icon of contacts in the smart phone.

The at least one operation object may be any other appropriate object.

Furthermore, the at least one operation object may be one, two or all of the objects in the above-described examples.

After displaying the at least one operation object for obtaining the second element on the display unit 100, the electronic device generates an operation instruction in response to a second operation on the at least one operation object, and executes the operation instruction to obtain the second element.

In particular, when the at least one operation object is an element in the above first example, the second operation may be a selection operation. A selection instruction may be generated in response to the selection operation. The selection instruction may be executed to determine, as the second element, "王楠 (Wang Nan)" from "王楠 (Wang Nan)", "王蓝 (Wang Lan)", "王男 (Wang Nan)" and "汪兰 (Wang Lan)".

As an example, on an interface presenting a number of selectable elements (e.g., "王楠 (Wang Nan)", "王蓝 (Wang Lan)", "王男 (Wang Nan)" and "汪兰 (Wang Lan)") on the display unit 100, a selection operation (i.e., touch selection operation) may be performed on the touch screen to select and determine "王楠 (Wang Nan)" from the selectable elements.

In a further example, a selection operation may be performed by means of voice input (i.e., a voice input of "select the first one") to select and determine "王楠 (Wang Nan)" from the selectable elements.

In a still further example, a selection operation may be performed by means of voice input (e.g., a voice input of "

楠(Nan) as in 楠木(Nan Mu)") to select and determine "王楠(Wang Nan)" from the selectable elements.

When the at least one operation object is an interface of a handwriting input application in the second example, the second operation may be an input operation, for example, an input operation for handwriting a character "楠(Nan)" on the display unit 100. An input instruction may be generated in response to the input operation. The input instruction may be executed to obtain the second element "楠(Nan)". The at least one operation object may also be an interface of a voice input application. In this case, the second operation may be a voice clip of "I need 楠木(Nan) as in 楠(Nan Mu), rather than 兰(Lan) as in 兰花(Lan Hua)". The second element "楠(Nan)" may be obtained using a voice recognition application in the electronic device.

When the at least one operation object is a contact database in the third example, the second operation may be a database-activation operation and a selection operation. A selection instruction is generated in response to the selection operation, so as to select the second element "楠(Nan)" from the contact database.

After obtaining the second element in the step S304, the method of this embodiment proceeds to step S305 where the first element is updated with the second element at the position where the first element has been displayed on the display unit 100.

When the first element is "王兰(Wang Lan)" and the second element is "王楠(Wang Nan)", the element "王兰(Wang Lan)" is updated with "王楠(Wang Nan)" at the position of "王兰(Wang Lan)".

After updating the first element with the second element in the step S305, the method proceeds to step S306 where the second element is displayed on the displaying unit 100. For example, the element "王楠(Wang Nan)" is displayed on the display unit 100.

In the method of this embodiment, the electronic device may detect a termination operation by the user to terminate the operation of sending a SMS message to 王兰(Wang Lan) before the timing value reaches 30 s. Upon detecting the termination operation, the electronic device generates and displays on the display unit 100 a confirmation icon for confirming the termination and a cancellation icon for canceling the termination in response to the termination operation. If the electronic device detects that the user operates on the confirmation icon, it generates and executes a termination operation to terminate the operation of send a SMS message to 王兰(Wang Lan). If the electronic device detects that the user operates on the cancellation icon, it generates and executes a cancellation instruction, i.e., it will then send a SMS message to 王兰(Wang Lan).

Referring to FIG. 2 showing a block diagram of the electronic device according to this embodiment, the electronic device includes a display unit 100, and a processor 200 connected to the display unit 100.

Here, the processor 200 is configured to obtain a first input content through a first operation, and transmit the first input content to the display unit 100 to display the first input content on the display unit 100. The first input content includes at least two elements.

The processor 200 is further configured to determine a first element from the at least two elements in accordance with a predetermined rule, obtain a second element through a second operation and transmit the second element to the display unit, and update the first element with the second element at the position where the first element has been displayed on the display unit 100 so as to display the second element on the display unit 100. The second element does not belong to the at least two elements.

In the electronic device of this embodiment, the processor 200 may obtain the first input content in response to the first operation on an application executed in the electronic device.

The processor 200 may obtain the first input content in response to the first operation on an application executed in the electronic device by activating the application, detecting whether the first operation is performed on the application, generating a first operation instruction in response to the first operation when it is detected that the first operation is performed on the application, and executing the first operation instruction to obtain the first input content through the application.

The application may be a content conversion application or an input application. When the application is the content conversion application, the first operation instruction is a conversion instruction for converting a content into the first input content. When the application is the input application, the first operation instruction is an input instruction for inputting the first input content.

When the first operation instruction is a conversion instruction, the processor 200 executes the conversion instruction to convert a sound or text content into the first input content using the content conversion application.

Alternatively, when the first operation instruction is an input instruction, the processor 200 executes the input instruction to input the first input content using the input application.

In the electronic device of this embodiment, the processor 200 may determine the first element by determining at least two candidate elements included in the first input content according to the predetermined rule, the at least two candidate elements including at least a command type element and a command object type element, obtaining a selection instruction in response to a selection by a user, executing the selection instruction to determine an editable candidate element from the at least two candidate elements, and determining as the first element an element of the editable candidate element which belongs to the at least two elements.

Here, the first element may be a replaceable element, and any element of the at least two elements other than the first element may an irreplaceable element.

In the electronic device of this embodiment, the processor 200 may be further configured to, after determining the first element, judge whether there is a second operation for obtaining the second element before a timing value of a timer in the electronic device reaches a predetermined value. When there is a second operation for obtaining the second element, the processor 200 may generate and display on the display unit at least one operation object for obtaining the second element in correspondence with the first element. Then, the processor 200 may generate an operation instruction based on a response to the second operation corresponding to the at least one operation object, and execute the operation instruction to obtain the second element.

The operations of the electronic device have been explained above in the embodiment with reference to FIG. 1. Details thereof will be omitted here.

Second Embodiment

In addition to the method for processing an input content and the electronic device according to the first embodiment, the present application provides a method for processing an instruction and an electronic device, which will be described with reference to FIGS. 3 and 4.

Figure 3:
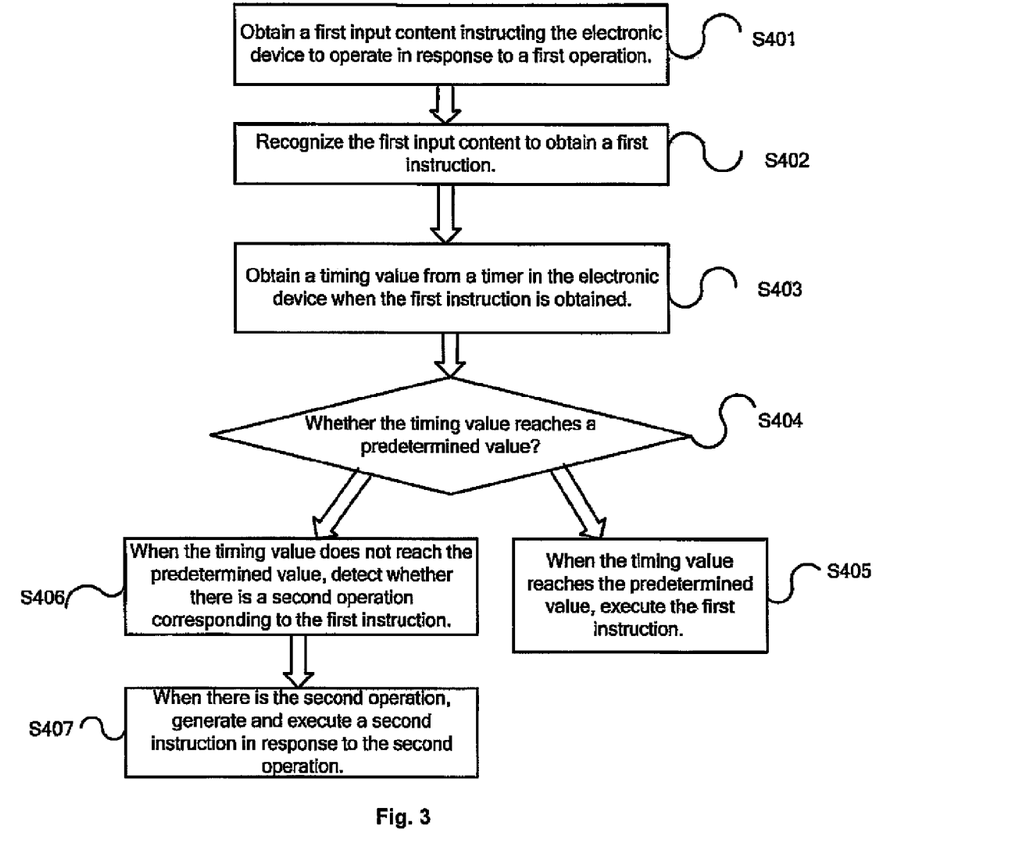
FIG. 3 is a flowchart illustrating a method for processing an instruction according to a second embodiment of the present application.

Referring to FIG. 3 showing a flowchart illustrating a method for processing an instruction according to the second embodiment of the present application, the method includes the following steps.

At step S401, a first input content instructing the electronic device to operate is obtained in response to a first operation.

In this embodiment, the step S401 may include obtaining a first input content instructing the electronic device to operate in response to a first operation on an application executed on the electronic device.

The step of obtaining the first input content in response to the first operation may include executing the application, detecting whether the first operation is performed on the application, generating a first operation instruction in response to the first operation when it is detected that the first operation is performed on the application, and executing the first operation instruction to obtain the first input content through the application.

Here, the application may be a content conversion application, such as a voice recognition application, or an input application, such as a voice input application, a handwriting input application or a keyboard input application.

When the application is the content conversion application, the first operation instruction is a conversion instruction for converting a content into the first input content. In this case, the conversion instruction is executed to convert a sound or text content into the first input content using the content conversion application.

For example, the smart phone has a voice message mailbox containing a message from "王兰(Wang Lan)": "Hi, I'm 王兰(Wang Lan), please send a SMS message to me when you are back," In this case, a voice recognition application in the smart phone recognizes the SMS message, and obtain an input content of "send a SMS message to 王兰(Wang Lan)".

When the application is the input application, the first operation instruction is an input instruction for inputting the first input content. In this case, the input instruction is executed to input the first input content using the input application. For example, when a user A wants to input an content to the smart phone, he/she can activate a voice input application installed in the smart phone and speak to the smart phone: "send a SMS message to 王兰(Wang Lan)". In this case, the smart phone can gather the voice, recognizes it using a voice recognition module in the smart phone and obtains a text of "send a SMS message to 王兰(Wang Lan)".

The first input content is obtained in the step S401. Here, the first input content includes at least two elements. Each of the at least two elements may be a character, a word or a phrase. For example, the text "send a SMS message to 王兰(Wang Lan)" includes three elements: a first element of "send a SMS message", a second element of "to" and a third element of "王兰(Wang Lan)".

After obtaining the first input content in the step S401, the method proceeds to step S402 in which the first input content is recognized to obtain a first instruction.

In this embodiment, the step S402 may include the following steps of determining at least two candidate elements included in the first input content according to the predetermined rule, the at least two candidate elements including at least a command type element and a command object type element, obtaining a selection instruction in response to a selection by a user, and executing the selection instruction to determine as the first instruction the first element belonging to the command type element from the at least two elements.

Next, the detailed process of the step S402 in this embodiment will be explained with the example where the first input content is "send a SMS message to 王兰(Wang Lan)", such that it can be more apparent to those skilled in the art.

The content "send a SMS message to 王兰(Wang Lan)" may be divided into three elements as above, including a third element of "send a SMS message", a second element of "to" and a first element of "王兰(Wang Lan)". Then, each element is compared with a corresponding database.

In particular, the element of "send a SMS message" is compared with a command database. When the element of "send a SMS message" is included in the command database, it is determined to be a command type element. In this embodiment, a command type element corresponds to a third candidate element, which is also known as a grammar slot.

The element of "to" is compared with a generic language database. When the element of "to" is included in the generic language database, it is determined as a generic language type element. In this embodiment, a generic language type element corresponds to a second candidate element, which is also known as a grammar slot.

The element of "王兰(Wang Lan)" is compared with a command object database. When the element of "王兰(Wang Lan)" is included in the command is object database, it is determined as a command object type element. In this embodiment, a command object type element corresponds to a first candidate element, which is also known as a grammar slot.

It is determined that the content "send a SMS message to 王兰(Wang Lan)" contains three candidate elements or grammar slots, of which the third candidate element is a command type element, the second candidate element is a generic language type element and the first candidate element is a command object type element.

When the content is displayed on the display unit 100 of the electronic device, one candidate element, or grammar slot, can be displayed in one framed area. For example, when the first input content is "send a SMS message to 王兰(Wang Lan)", the first element "王兰(Wang Lan)" is displayed in a first framed display area, the second element "to" is displayed in a second framed display area, and the third element "send a SMS message" is displayed in a third framed display area. The grammar slots may not be displayed in framed areas. Other display schemes can also be used.

After determining the first element as the first instruction in the step S402, the method of this embodiment proceeds to step S403 where a timing value is obtained from a timer in the electronic device when the first instruction is obtained.

During the timing period, the method of this embodiment proceeds to step S404 where it is judged whether the timing value reaches a predetermined value. When the timing value reaches the predetermined value, the method proceeds to step S405 where the first instruction is executed when the timing value reaches the predetermined value.

Next, the process from the step S402 to the step S403 and further to the step S404 will be explained with an example in which the first instruction is "send a SMS message".

In the method of this embodiment, a time value may be preset, e.g., 30 s, and a is timing value is obtained from a timer in the electronic device to judge whether the timing value reaches 30 s.

If it is judged that the timing value reaches 30 s, it means that the user does not modify the instruction of "send a SMS message" or terminate the operation of sending a SMS message to 王兰 (Wang Lan), the electronic device will invoke an SMS application to send a SMS message to 王兰 (Wang Lan). Here, the content of the SMS message may be pre-configured or input by the user to the SMS application using an input application. Here, the input application may be a keyboard input application, a handwriting input application or a voice input application.

The method of this embodiment further includes the following steps after the step S404.

At step S406, when the timing value does not reach the predetermined value, it is detected whether there is a second operation corresponding to the first instruction.

At step S407, when there is the second operation, a second instruction is generated and executed in response to the second operation.

Here, when the second operation is a termination operation for terminating the first instruction to be executed by the electronic device, the step S407 may include generating and executing an termination instruction in response to the termination operation, such that the first instruction will not be executed by the electronic device.

When the second operation is a modification operation for modifying the first instruction, the step S407 may include generating a modification instruction in response to the modification operation, executing the modification instruction to modify the first instruction into a second instruction, and executing the second instruction.

Next, the process of the steps S406 and S407 will be explained with an example in which the first instruction is "send a SMS message".

If the electronic device detects a modification operation by the user to modify "send a SMS message" before the timing value reaches 30 s, it generates and displays on the display unit 100 at least one operation object for obtaining the second element.

The at least one operation object may be a link to an input application or an interface of an input application. For example, the interface may be an interface of a voice input application, including a microphone icon, a mute icon and a stop icon thereon. The at least one operation object may be a link to a keyboard input application, such as an icon of Baidu Pinyin input method.

The at least one operation object may be any other appropriate object.

After displaying the at least one operation object for obtaining the second element on the display unit, the electronic device generates an operation instruction in response to a second operation on the at least one operation object and executes the operation instruction to obtain the second element.

In particular, when the at least one operation object is an interface of a handwriting input application, the second operation may be an input operation, e.g., an input operation for handwriting three words of "make a call" on the display unit. An input instruction may be generated in response to the input operation. The input instruction may be executed to obtain the second element "make a call" as a second instruction. The at least one operation object may also be an interface of a voice input application. In this case, the second operation can be a voice clip of "I need to make a call, rather than sending a SMS message, to 王兰 (Wang Lan)." The second element "make a call" may be obtained as a second instruction using a voice recognition application in the electronic device.

In the method of this embodiment, the electronic device may detect a termination operation by the user to terminate the operation of sending a SMS message to 王兰 (Wang Lan) before the timing value reaches 30 s. Upon detecting the termination operation, the electronic device generates and displays on the display unit a confirmation icon for confirming the termination and a cancellation icon for canceling the termination in response to the termination operation. If the electronic device detects that the user operates on the confirmation icon, it generates and executes a termination operation to terminate the operation of send a SMS message to 王兰 (Wang Lan). If the electronic device detects that the user operates on the cancellation icon, it generates and executes a cancellation instruction, i.e., it will then send a SMS message to 王兰 (Wang Lan).

As described above, in the method of this embodiment, when the timing value does not reach a predetermined value, it is detected whether there is a second operation corresponding to the first instruction. When there is the second operation and the second operation is a modification operation for modifying the first instruction, a modification instruction is generated and executed in response to the modification operation.

In the method of this embodiment, there are two methods for generating and executing a modification instruction in response to the modification operation.

In the first method, a first candidate element (i.e., grammar slot) corresponding to the first instruction is configured as an editable candidate element, and then a first instruction in the first candidate element may be modified to obtain a second instruction. The operation of configuring the first candidate element as an editable candidate element may be carried out in any of the step S407 and its preceding steps. The operation of configuring the first candidate element as an editable candidate element in the method of this embodiment will be described in the following.

After determining that the content "send a SMS message to 王兰 (Wang Lan)" contains three candidate elements, the user may perform a selection by pressing a key in a physical keyboard or touching the display unit. For example, when the display unit is a touch screen, the user may click on the first framed display area corresponding to the first candidate element. Upon detecting the click action, the electronic device generates a selection instruction in response to the click action and executes the selection instruction to determine the first candidate element as an editable candidate element. In this way, the user may edit the first element (i.e., the first instruction) in the first candidate element. In particular, the user may edit the first instruction "send a SMS message" to modify the first instruction "send a SMS message" into a second instruction "make a call". While the first candidate element is editable, the second and third candidate elements are not editable.

In the second method, a voice of "make a call to 王兰(Wang Lan)" may be re-input using a voice input application. A voice recognition module may recognize that the user wants to execute the instruction "make a call," and the operation of making a call, rather than sending a SMS message, to 王兰(Wang Lan) will be executed.

Figure 4:
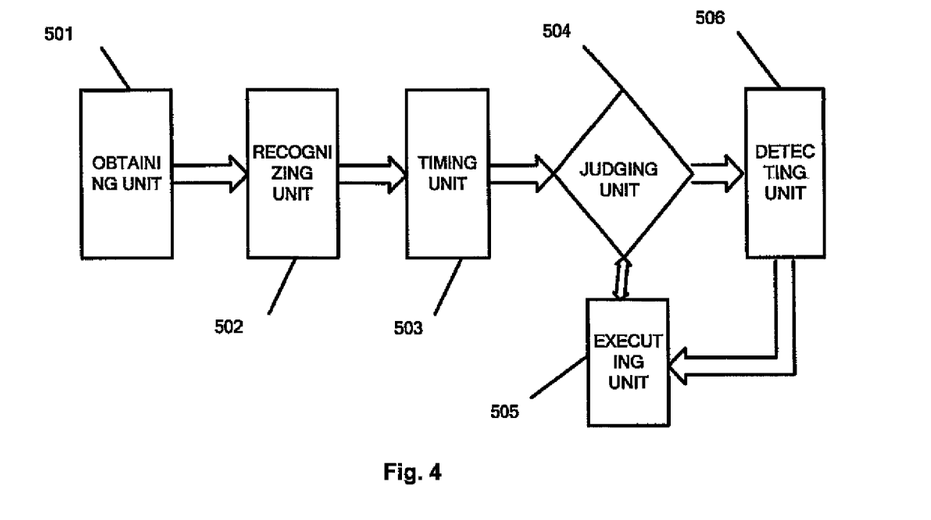
FIG. 4 is a block diagram of an electronic device according to a second embodiment of the present application.

Referring to FIG. 4 showing a block diagram of the electronic device according to this embodiment, the electronic device includes the following units.

An obtaining unit 501 is configured to obtain a first input content instructing the electronic device to operate in response to a first operation.

A recognizing unit 502 is configured to recognize the first input content to obtain a first instruction.

A timing unit 503 is configured to obtain a timing value from a timer in the electronic device when the first instruction is obtained.

A judging unit 504 is configured to judge whether the timing value reaches a to predetermined value.

An executing unit 505 is configured to execute the first instruction when the timing value reaches the predetermined value.

In an embodiment, the electronic device further includes the following units.

A detecting unit 506 is configured to detect whether there is a second operation corresponding to the first instruction when the timing value does not reach the predetermined value.

Here, the executing unit 505 is configured to generate and execute a second instruction in response to detection of the second operation.

Many modifications and variants can be made by those skilled in the art without departing from the spirit and scope of the present application. These modifications and variants are to be encompassed by the scope of the present application as they fall into the scope defined by claims and their equivalents.

What is claimed is:

1. A method for processing an input content in an electronic device comprising a display unit and a processor, the method comprising:
    displaying, on the display unit, a first input content including at least two elements in response to a first input operation of a user, each of the elements including at least one character, wherein the first input operation is a voice input operation;
    selecting, by the processor, one of the at least two elements included in the first input content as a first element according to a predetermined rule while the first input content is displayed on the display unit;
    setting, by the processor, the first element into an editable state in which the user can edit the first element;
    displaying, on the display unit, at least one additional element in response to setting the first element into an editable state, the at least one additional element not belonging to the at least two elements;
    selecting, by the processor, one of the at least one additional element in response to a second input operation of the user; and
    replacing, by the processor, the first element with the additional element at a position where the first element has been displayed on the display unit,
    wherein the at least one additional element is determined by a pronunciation of the first element.

2. The method of claim 1, wherein displaying the first input content in response to the first input operation comprises:
    displaying the first input content in response to the first input operation on an application executed in the electronic device.

3. The method of claim 2, wherein displaying the first input content in response to the first input operation on an application executed in the electronic device comprises:
    activating the application;
    detecting whether the first input operation is performed on the application;
    generating a first input operation instruction in response to the first input operation when it is detected that the first input operation is performed on the application; and
    executing the first operation instruction to obtain the first input content through the application.

4. The method of claim 3, wherein the application is a content conversion application or an input application, and
    when the application is the content conversion application, the first operation instruction is a conversion instruction for converting a content into the first input content,
    when the application is the input application, the first operation instruction is an input instruction for inputting the first input content.

5. The method of claim 4, wherein executing the first operation instruction to obtain the first input content through the application comprises:
    executing the conversion instruction to convert a sound or text content into the first input content using the content conversion application; or
    executing the input instruction to input the first input content using the input application.

6. The method of claim 1, the at least two candidate elements includes at least a command type element and a command object type element.

7. The method of claim 1, wherein the first element is a replaceable element, and any of the at least two elements other than the first element is an irreplaceable element.

8. The method of claim 5, wherein obtaining an additional second element through a second input operation comprises:
    generating and displaying on the display unit at least one object for obtaining the additional element in correspondence with the first element;
    generating an operation instruction based on a response to the second input operation corresponding to the at least one object; and
    executing the operation instruction to obtain the additional element.

9. The method of claim 5, further comprising, after determining the first element from the displayed at least two elements in accordance with the predetermined rule:
    judging whether there is a second input operation for obtaining the additional element before a timing value of a timer in the electronic device reaches a predetermined value; and
    obtaining the second element through the second input operation when there is a second operation for obtaining the additional element.

10. An electronic device, comprising:
    a display unit; and
    a processor connected to the display unit, wherein
    the processor is configured to display, on the display unit, a first input content in response to a first input operation of a user, the first input content comprising at least two elements, each of the elements including at least one character, wherein the first input operation is a voice input operation;

the processor is further configured to select one of the at least two elements included in the first input content as a first element according to a predetermined rule while the first input content is displayed on the display unit, set the first element into an editable state in which the user can edit the first element, display, on the display unit, at least one additional element in response to setting the first element into an editable state, the at least one additional element not belonging to the at least two elements, select one of the at least one additional element in response to a second input operation of the user, and replace the first element with the additional element at a position where the first element has been displayed on the display unit, wherein the at least one additional element is determined by a pronunciation of the first element.

11. The device of claim 10, wherein the processor is configured to display the first input content in response to the first input operation on an application executed in the electronic device.

12. The device of claim 11, wherein the processor is configured to:

activate the application;

detect whether the first operation is performed on the application;

generate a first operation instruction in response to the first operation when it is detected that the first input operation is performed on the application; and execute the first operation instruction to obtain the first input content through the application.

13. The device of claim 12, wherein the application is a content conversion application or an input application, and when the application is the content conversion application, the first operation instruction is a conversion instruction for converting a content into the first input content, when the application is the input application, the first operation instruction is an input instruction for inputting the first input content.

14. The device of claim 13, wherein the processor is configured to:

execute the conversion instruction to convert a sound or text content into the first input content using the content conversion application; or execute the input instruction to input the first input content using the input application.

15. The device of claim 10, at least two candidate elements includes at least a command type element and a command object type element.

16. The device of claim 10, wherein the first element is a replaceable element, and any of the at least two elements other than the first element is an irreplaceable element.

17. The device of claim 14, wherein the processor is configured to:

generate and displaying on the display unit at least one object for obtaining the additional element in correspondence with the first element;

generate an operation instruction based on a response to the second input operation corresponding to the at least one object; and execute the operation instruction to obtain the additional element.

18. The device of claim 14, wherein the processor is configured to, after selecting the first element from the displayed at least two elements in accordance with the predetermined rule:

judge whether there is a second input operation for obtaining the additional element before a timing value of a timer in the electronic device reaches a predetermined value; and obtain the second element through the additional input operation when there is a second input operation for obtaining the additional element.

19. The method of claim 1, wherein the at least one additional element is an element having a pronunciation or meaning identical or similar with the first element.

20. The device of claim 10, wherein the at least one additional element is an element having a pronunciation or meaning identical or similar with the first element.

* * * * *